United States Patent [19]

Moore

[11] Patent Number: 5,651,210
[45] Date of Patent: Jul. 29, 1997

[54] FISHING FLOAT APPARATUS

[76] Inventor: Don L. Moore, P.O. Box 1022, West Plains, Mo. 65775

[21] Appl. No.: 504,651

[22] Filed: Jul. 20, 1995

[51] Int. Cl.$^6$ ............................................. A01K 91/00
[52] U.S. Cl. ..................................... 43/43.14; 43/4.5
[58] Field of Search ......................... 43/4.5, 17, 25, 43/43.13, 43.14

[56] References Cited

U.S. PATENT DOCUMENTS

| | | | |
|---|---|---|---|
| 427,730 | 5/1890 | Bond. | |
| 2,677,208 | 5/1954 | Newton | 43/43.11 |
| 2,892,198 | 6/1959 | Gruemberg | 43/25 |
| 2,903,718 | 9/1959 | Wright | 43/25 |
| 2,924,039 | 2/1960 | Morton | 43/43.11 |
| 2,958,976 | 11/1960 | Adams | 43/43.12 |
| 3,149,435 | 9/1964 | Nordeen | 43/43.11 |
| 3,246,417 | 4/1966 | Esplin | 43/43.14 |
| 3,597,871 | 8/1971 | Hansen | 43/43.14 |
| 3,698,121 | 10/1972 | Nordeen | 43/43.14 |
| 4,648,194 | 3/1987 | Carroll | 43/4.5 |
| 4,766,690 | 8/1988 | Trosha | 43/25 |
| 5,207,013 | 5/1993 | Bartok | 43/4.5 |
| 5,233,781 | 8/1993 | Bigelow | 43/17 |

*Primary Examiner*—Kurt Rowan
*Attorney, Agent, or Firm*—Walker, McKenzie & Walker, P.C.

[57] ABSTRACT

A fishing float apparatus for floatably supporting a fishing line in a body of water. The device includes a body member; a balloon attached to the body member, the balloon having a deflated position and an inflated position; a protective cover for covering the balloon when the balloon is in deflated; a pump for inflating the balloon; and attachment structure for attaching one end of the fishing line to the body member.

8 Claims, 4 Drawing Sheets

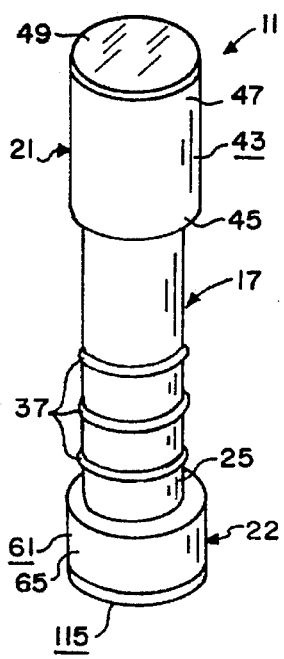
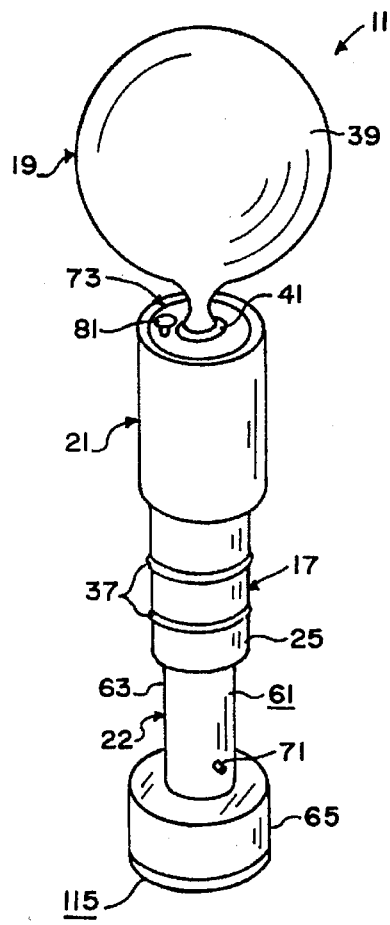
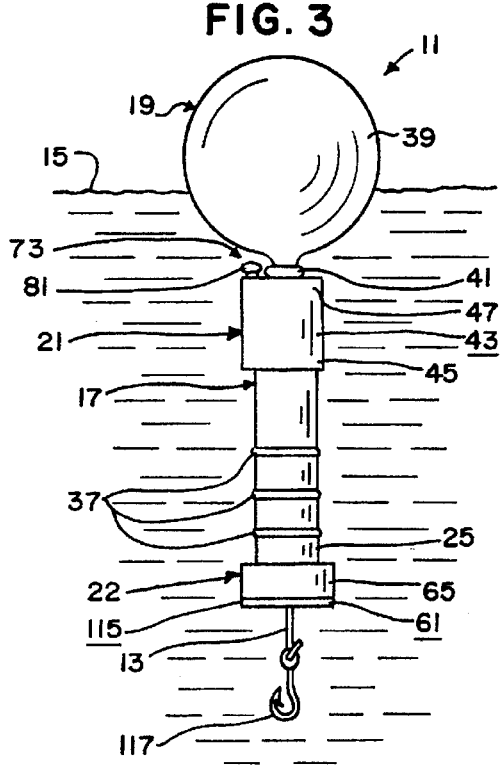
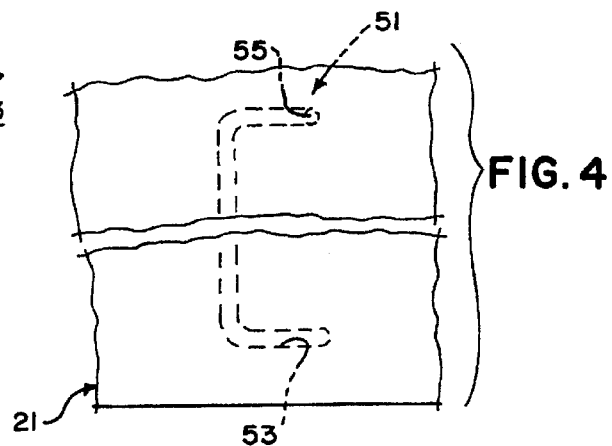
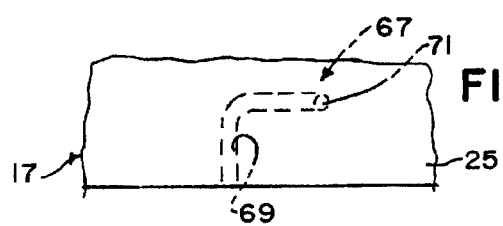

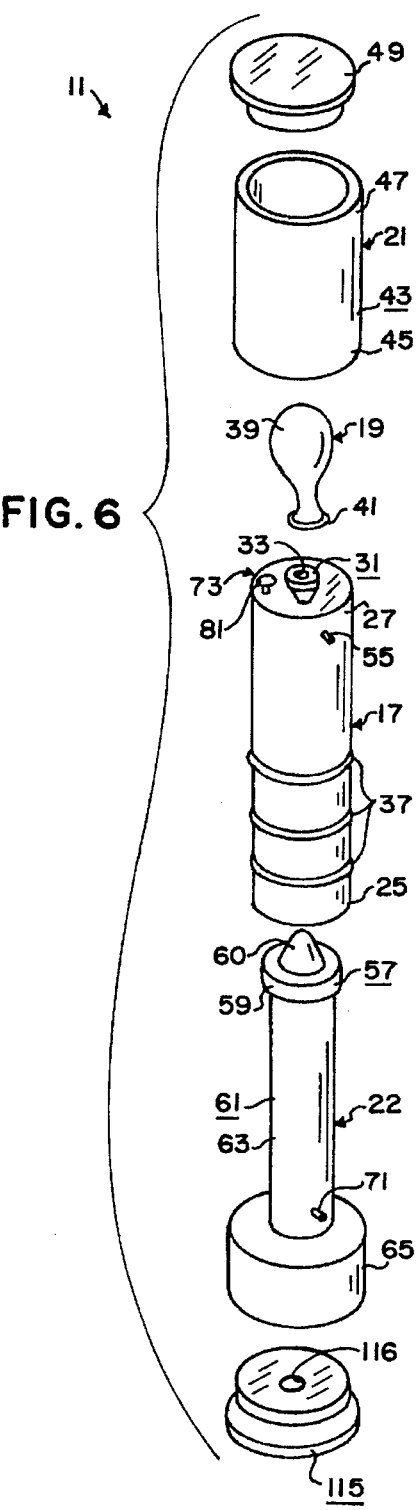
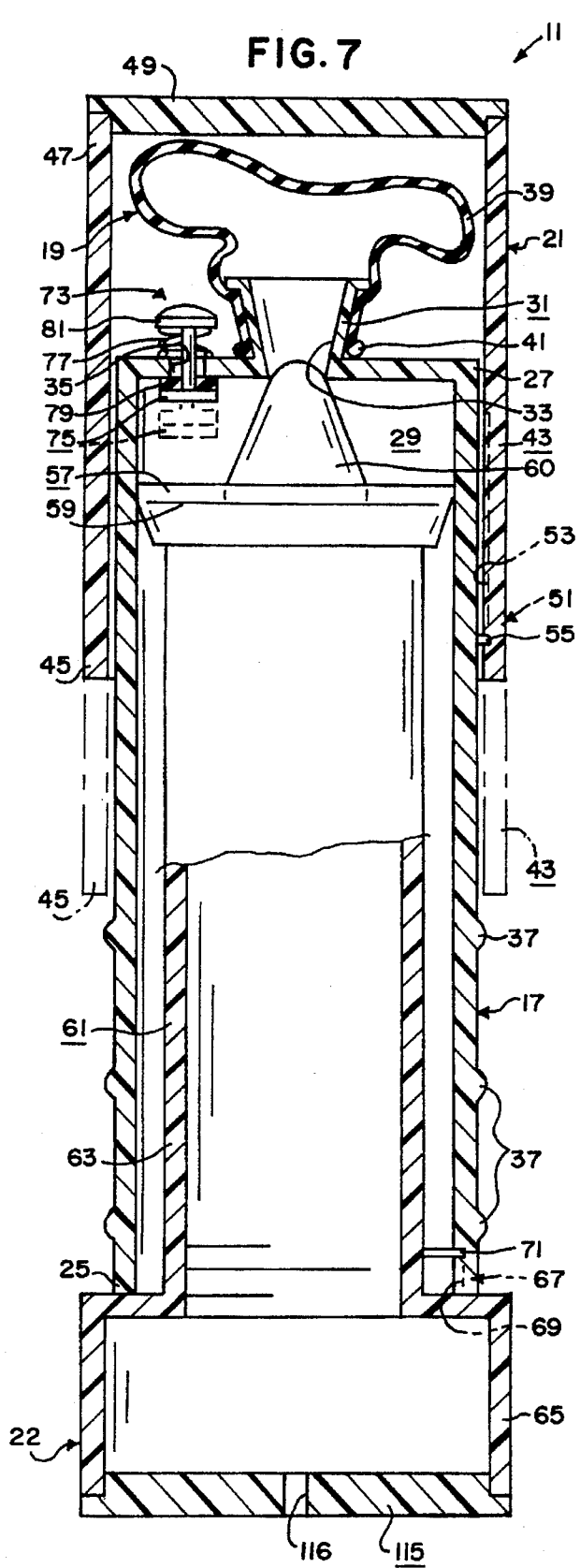

FISHING FLOAT APPARATUS

BACKGROUND OF THE INVENTION

1. Field of the Invention

The present invention relates, in general, to a fishing float apparatus and, more specifically, to a fishing float apparatus that can be safely stored when not in use and that can be easily inflated for so-called "jug" or "float" fishing.

2. Information Disclosure Statement

A preliminary patentability search conducted in class 43, subclasses 43.11 and 43.14 produced the following patents that appear to be relevant to the present invention:

Bond, U.S. Pat. No. 427,730, issued May 13, 1890, discloses a float for fish lines including tubular stem and an inflatable body surrounding the stem. An aperture passes from the stem into the body to allow a fisherman to blow into the tubular stem and thereby inflate the body. A plug is then used to close the tubular stem.

Newton, U.S. Pat. No. 2,677,208, issued May 4, 1954, discloses a fishing float including a hollow, substantially spherical body having a valve through which air can be blown to inflate the body.

Morton, U.S. Pat. No. 2,924,039, issued Feb. 9, 1960, discloses a fishing apparatus including an elongated cylindrical float having an irregularly formed outer surface providing alternate ridges and depressions for allowing fishing line to be wound thereabout.

Nordeen, U.S. Pat. No. 3,149,435, issued Sep. 22, 1964, discloses a fishing float in the form of a balloon having an U-shaped support attached thereto with a propeller supported by one of the legs thereof.

Esplin, U.S. Pat. No. 3,246,417, issued Apr. 19, 1966, discloses a fishing device that can be inflated to lift fish to the surface of a body of water.

Hansen, U.S. Pat. No. 3,597,871, issued Aug. 10, 1971, discloses a fishing device including an elongated rod member formed with a cylinder chamber having a piston reciprocable therein, and a resilient elastic sleeve member covering a portion of the outer surface of the rod member. The elastic sleeve member can be inflated to cause the device to float.

Nordeen, U.S. Pat. No. 3,698,121, issued Oct. 17, 1972, discloses a fishing apparatus having a buoyant float assembly consisting of a container and a lighter-than-air balloon that will lift a fish vertically to the top of a body of water.

Nothing in the known prior art discloses or suggests the present invention. More specifically, nothing in the known prior art discloses or suggests a fishing float apparatus including a body member; a balloon attached to the body member, the balloon having a deflated position and an inflated position; a protective cover for covering the balloon when the balloon is in the deflated position; pump means for inflating the balloon; and attachment means for attaching one end of a fishing line to the body member.

SUMMARY OF THE INVENTION

The present invention provides a fishing float apparatus that can be safely stored when not in use and that can be easily inflated for so-called "jug" or "float" fishing. A basic concept of the present invention is to provide a fishing float apparatus including a balloon that can be inflated to float on the surface of a body of water, and including means for covering the balloon when the balloon is not inflated to allow the apparatus to be stored without danger of damaging the balloon.

The fishing float apparatus of the present invention comprises, in general, a body member; a balloon attached to the body member, the balloon having a deflated position and an inflated position; a protective cover for covering the balloon when the balloon is in the deflated position; pump means for inflating the balloon; and attachment means for attaching one end of a fishing line to the body member.

One object of the present invention is to provide a fishing apparatus that eliminates the need for "jugs" (e.g., typical plastic milk or soft drink bottles, etc.) for so-called "jug" or "float" fishing.

Another object of the present invention is to provide such a fishing apparatus that can be safely stored in a relative small area and that can be inflated in a short period of time.

Another object of the present invention is to provide such a fishing apparatus that includes a storage area for fishing line, weight, and hook, etc., when not in use.

BRIEF DESCRIPTION OF THE DRAWINGS

FIG. 1 is a perspective view of the fishing float apparatus of the present invention, shown in a fully closed position.

FIG. 2 is a perspective view of the fishing float apparatus of the present invention, shown in a fully opened position.

FIG. 3 is a front elevational view of the fishing float apparatus of the present invention, shown in combination with a body of water.

FIG. 4 is an elevational view somewhat diagrammatically showing the guide means for guiding the movement of the protective cover of the fishing float apparatus of the present invention between extended and retracted positions.

FIG. 5 is an elevational view somewhat diagrammatically showing the lock means for locking the pump means of the fishing float apparatus of the present invention in a closed position.

FIG. 6 is an exploded perspective view of the fishing float apparatus of the present invention.

FIG. 7 is an enlarged sectional view of the fishing float apparatus of the present invention in a closed position.

DESCRIPTION OF THE PREFERRED EMBODIMENT

Figure 8:
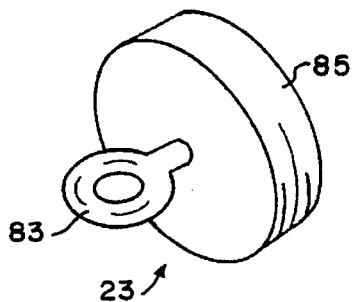
FIG. 8 is a perspective view of a first embodiment of the attachment means of the fishing float apparatus of the present invention.

The fishing float apparatus of the present invention is shown in FIGS. 1–14, and identified by the numeral 11. The fishing float apparatus 11 is especially designed for supporting a fishing line 13 in a body 15 of water such as a lake, river or the like. The fishing float apparatus 11 provides a float that is compact and well-protected when not in use to allow a plurality of similar fishing float apparatus 11 to be stored or contained in a small area such as within a standard fishing tackle box or the like, and which can be easily and quickly converted to an in-use status by simple manipulations.

The fishing float apparatus 11 includes a body member 17, a balloon 19 attached to the body member 17, a protective cover 21 for covering the balloon 19 when the balloon 19 is deflated, pump means 22 for inflating the balloon 19, and attachment means 23 for attaching one end of the fishing line 13 to the body member 17.

The body member 17 preferably has a first end 25, a second end 27, and a chamber 29 extending between the first and second ends 25, 27 (see FIG. 7). The balloon 19 is attached to the second end 27 of the body member 17. More specifically, the second end 27 of the body member 17 preferably includes a flanged nipple 31 for allowing the balloon 19 to be securely attached thereto (see FIGS. 6 and 7). The body member 17 may consist, in general, of a plastic tube having an opened first end 25 and a substantially closed second end 27. The substantially closed second end 27 has a first passageway or aperture 33 through the flanged nipple 31 to allow air to pass therethrough between the chamber 29 and the interior of the balloon 19. The substantially closed second end 27 preferably has a second passageway or aperture 35 therethrough (see FIG. 7) defining an air exhaust port for reasons which will hereinafter become apparent. Means for enhancing the user's grip of the body member 17 are preferably provided on the outer surface of the body member 17 adjacent the first end 25 thereof. More specifically, spaced ridges or rings 37 may be provided around the outer circumference of the body member 17 as clearly shown in the drawings. The body member 17 may be constructed in various specific sizes and designs, out of various materials, and in various manners as will now be apparent to those skilled in the art. Thus, for example, the body member 17 may be molded out of plastic with an outer diameter of approximately 1.25 inches (approximately 3.175 centimeters) and a length of approximately 5.5 inches (13.97 centimeters).

The balloon 19 may be a standard, heavy duty elastic balloon consisting of an inflatable rubber bag or body portion 39 and a relatively small, reinforced mouth 41 for being pulled or snapped over the flanged nipple 31 in such a manner that the balloon 19 will be tightly secured thereto. The balloon 19 has a deflated position as shown in FIGS. 6 and 7, and an inflated position as shown in FIGS. 2 and 3.

The protective cover 21 is preferably slidably attached to the body member 17 for movement between an extended position as shown in FIGS. 1 and 7 in which the balloon 19 is covered, and a retracted position as shown in FIGS. 2 and 3 in which the balloon 19 is uncovered. The protective cover 21 preferably includes a hollow tube or sleeve 43 having an open first end 45 attached to the second end 27 of the body member 17 and has an open second end 47. The protective cover 21 may include a cap member 49 removably attached to the second end 47 of the sleeve 43 for selectively closing the open second end 47 of the sleeve 43 of the protective cover 21 when the balloon 19 is in the deflated position to fully and completely cover and protect the balloon 19 when the balloon 19 is in the deflated position. The sleeve 43 may be constructed in various specific sizes and designs, out of various materials, and in various manners as will now be apparent to those skilled in the art. Thus, for example, the cylindrical tube 43 may be molded out of plastic as a substantially rigid cylindrical tube with an inner diameter sized to slide over the second end 27 of the body member 17 and with a length sufficient to cover the balloon 19 when in the extended position and the balloon 19 is in the deflated position.

The fishing float apparatus 11 preferably includes guide means 51 for guiding the movement of the protective cover 21 between the extended and retracted positions. The guide means 51 may include one or more guide tracks 53 on the body member 17 and one or more guide pins 55 on the sleeve 43 for sliding within the guide track 53. Each guide track 53 may be configured to securely hold the protective cover 21 in the extended position and the retracted position. More specifically, each end of each guide track 53 may be bent at 90° or so whereby the sleeve 43 can be rotated about the longitudinal axes of the sleeve 43 and the body member 17 to thereby securely hold the sleeve 43 in either the fully extended or fully retracted position as will now be apparent to those skilled in the art.

The pump means 22 preferably includes a piston 57 reciprocally mounted in the chamber 29 of the body member 17 for pumping air into the balloon 19 to inflate the balloon 19 when the piston 57 is reciprocated within the chamber 29. The piston 57 preferably includes a piston head 59 sized to reciprocate within the chamber 29 while tightly engaging the interior walls of the chamber 29, etc. The piston head 59 may be molded or otherwise constructed out of a resilient rubber such a neoprene in any specific design for forcing air out the portion of the chamber 29 between the piston head 59 and the second end 27 of the body member 17 when moved toward the second end 27 of the body member 17, and for allowing air to enter the portion of the chamber 29 between the piston head 59 and the second end 27 when moved toward the first end 25 of the body member 17 as will now be apparent to those skilled in the art. The piston head 59 preferably has a projection 60 or the like as clearly shown in FIGS. 6, 7, 13 and 14 for abutting the mouth of and closing the first passageway 33 through the second end 27 of the body member 17 when the body member 17 is in the closed position as clearly shown in FIG. 7 to prevent air from passing through the first passageway 33.

The pump means 22 preferably includes a handle 61 for allowing manual reciprocation of the piston 57 in the chamber 29 of the body member 17. The handle 61 preferably includes an elongated shaft 63 attached to the piston head 59 of the piston 57. The handle 61 preferably includes a grip portion 65 attached to the end of the shaft 63 opposite the piston head 59. The shaft 63 and grip portion 65 are preferably hollow and may be constructed in various specific sizes and designs, out of various materials, and in various manners as will now be apparent to those skilled in the art. Thus, for example, the shaft 63 may be molded out of plastic as a substantially rigid cylindrical tube with an inner diameter sized to slide within the chamber 29 of the body member 17 and with a length sufficient to allow the piston head 59 to be reciprocated within the chamber 29 of the body member 17 substantially completely between the first and second ends 25, 27 of the body member 17.

The fishing float apparatus 11 may include lock means 67 for locking the pump means 22 to the body member 17 in a compact, closed position (i.e., with the piston head 59 positioned substantially adjacent the second end 27 of the body member 17). The lock means 67 may include one or more grooves or tracks 69 in the body member 17 and one or more lock pins 71 on the shaft 63 for sliding within the tracks 69. Each track 69 may be configured to securely hold the pump means 22 in the closed position. More specifically, each end of each track 69 may be bent at 90° or so whereby the body member 17 can be rotated about the longitudinal axes of the shaft 63 and the body member 17 to thereby securely hold the shaft 63, and thus the pump means 22, in the closed position as will now be apparent to those skilled in the art. When lock means 67 is used to lock the pump means 22 to the body member 17 in a compact, closed position (i.e., with the piston head 59 positioned substantially adjacent the second end 27 of the body member 17), the projection 60 will be held in abutting relationship against the mouth of the first passageway 33 through the second end 27 of the body member 17 as clearly shown in FIG. 7 to close the first passageway 33 and prevent air from passing through the first passageway 33 as will now be apparent to those skilled in the art.

The fishing float apparatus 11 preferably includes an air release valve means 73 for allowing air to pass from the balloon 19 to deflate the balloon 19. The air release valve means 73 preferably includes a valve member 75 movable between a closed position in which the second passageway 35 (i.e., the air exhaust port) of the body member 17 is blocked to prevent air from passing therethrough and an open position in which the second passageway 35 (i.e., the air exhaust port) of the body member 17 is opened to allow air to pass therethrough. The valve means 73 preferably includes spring means 77 for normally urging the valve member 75 to the closed position. The valve means 73 preferably includes a rubber seal 79 for being urged against the second passageway 35 (i.e., the air exhaust port) of the body member 17 when the valve member 75 is in the closed position. The rubber seal 79 preferably consists of a neoprene washer or the like for enhancing the air-tight seal around the second passageway 35, etc. The valve member 75 preferably includes a button-like end 81 for allowing manual pressure to be applied against the spring means 77 to open the valve means 73 and allow air to escape the chamber 29 of the body member 17 and the balloon 19 as will now be apparent to those skilled in the art.

The attachment means 23 is preferably attached to the handle 61 of the pump means 22. The attachment means 23 may be constructed in various specific sizes and designs, out of various materials, and in various manners as will now be apparent to those skilled in the art.

Figure 9:
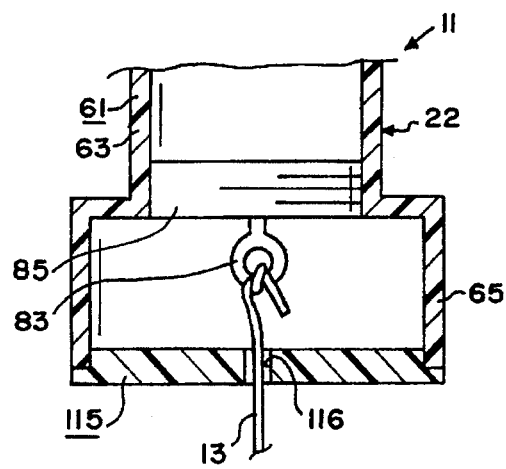
FIG. 9 is a sectional view of one end of the handle of the pump means of the fishing float apparatus of the present invention with the attachment means of FIG. 8 combined therewith.

A first embodiment of the attachment means 23 is shown in FIGS. 8 and 9, and includes an eyelet 83 for being attached to the handle 61 of the pump means 22 and for allowing one end of the fishing line 13 to be tied thereto. The eyelet 83 may be mounted to a base 85 having external threads thereof for being screwed to internal threads provided in the hollow end of the shaft 63 of the handle 61 of the pump means 22 as clearly shown in FIG. 9.

Figure 10:
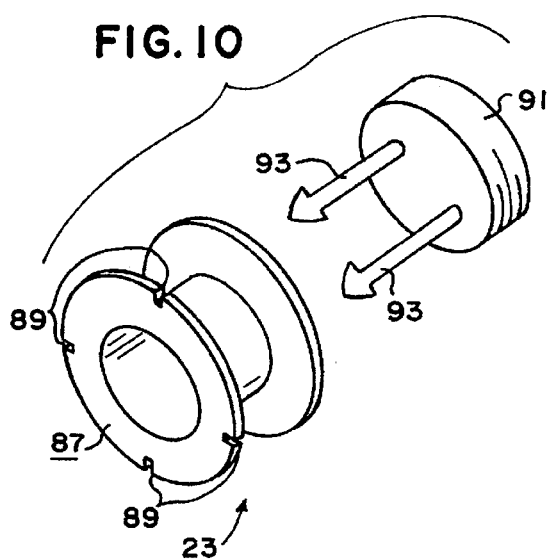
FIG. 10 is an exploded perspective view of a second embodiment of the attachment means of the fishing float apparatus of the present invention.
Figure 11:
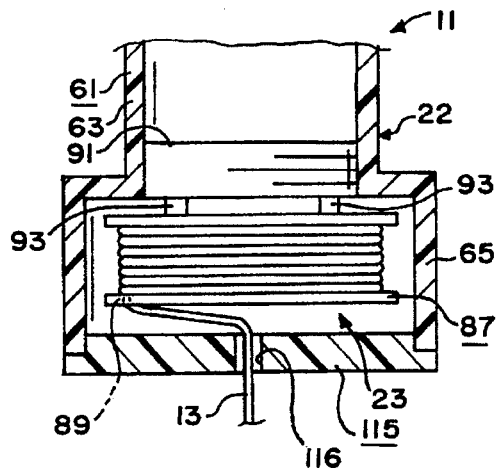
FIG. 11 is a sectional view of one end of the handle of the pump means of the fishing float apparatus of the present invention with the attachment means of FIG. 10 combined therewith.

A second embodiment of the attachment means 23 is shown in FIGS. 10 and 11 and includes a spool or reel member 87 for allowing a length of the fishing line 13 to be secured thereto and wound thereabout. The reel member 87 may have one or more slots 89 therein for allowing a portion of the fishing line 13 to be clamped thereto and for allowing the length of the fishing line 13 extending therefrom to be controlled, etc., as will now be apparent to those skilled in the art. The reel member 87 may be mounted to a base 91 having external threads thereon for being screwed to the internal threads provided in the hollow end of the shaft 63 of the handle 61 of the pump means 22 as clearly shown in FIG. 11. The base 91 may include fingers or prongs 93 for holding the reel member 87 thereto as will now be apparent to those skilled in the art.

Figure 12:
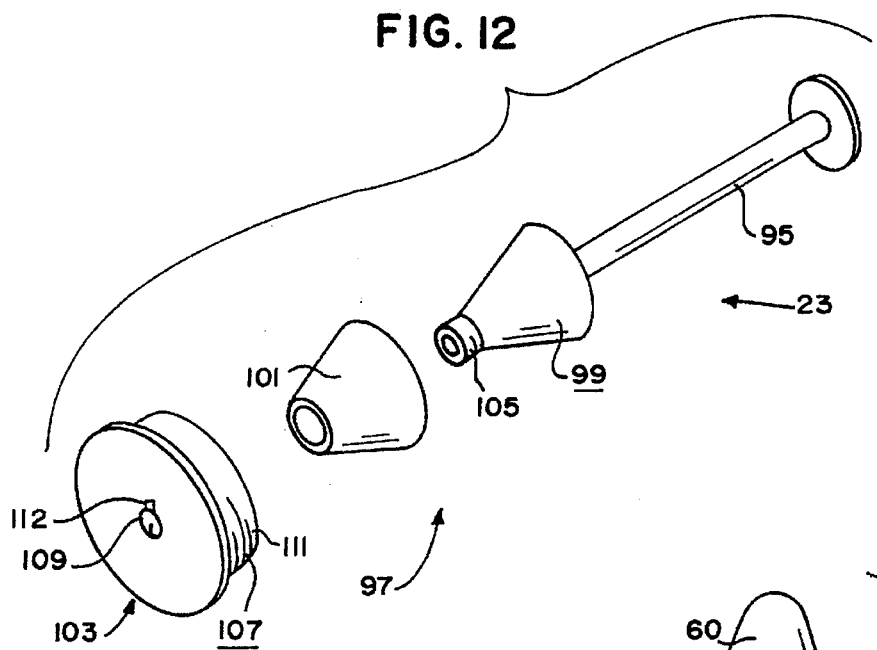
FIG. 12 is an exploded perspective view of a third embodiment of the attachment means of the fishing float apparatus of the present invention.
Figure 14:
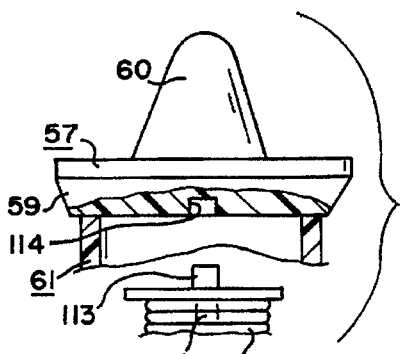
FIG. 14 is an exploded partially sectional view of a portion of the attachment means and related structure of FIG. 12.
Figure 13:
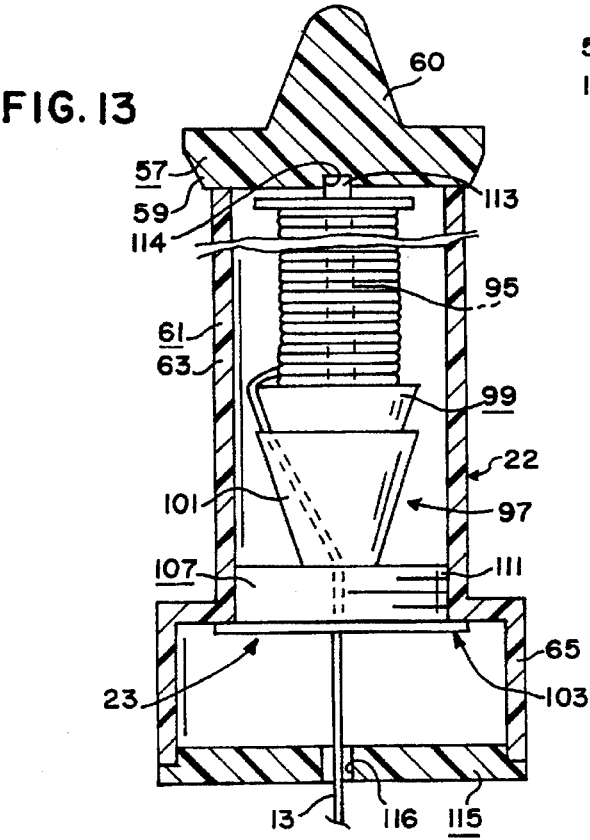
FIG. 13 is a sectional view of one end of the handle of the pump means of the fishing float apparatus of the present invention with the attachment means of FIG. 12 combined therewith.

A third embodiment of the attachment means 23 is shown in FIGS. 12–14 and includes a spool or reel member 95 for allowing a length of the fishing line 13 to be secured thereto and wound thereabout and a friction line lock means 97 for allowing variable lengths of the fishing line 13 to be unwound from the reel member 95. The reel member 95 is preferably received within the hollow cavity of the shaft 63 of the handle 61 of the pump means 22 as clearly shown in FIG. 13. The friction line lock means 97 preferably includes a first cone 99 attached to the reel member 95, a second cone 101 positioned over the first cone 99, and urging means 103 for urging the second cone 101 against the first cone 99 so that the fishing line 13 can be frictionally secured to the friction line lock means 97 by placing a length of the fishing line 13 between the first and second cones 99, 101 and then urging the second cone 101 against the first cone 99 as will now be apparent to those skilled in the art. The first cone 99 is preferably fixedly attached to one end of the reel member 95 and has a threaded distal end portion 105 (i.e., an externally threaded end portion). The urging means 103 preferably includes a base 107 having a first threaded portion 109 (i.e., an internally threaded bore) for attachment to the threaded distal end portion 105 to clamp the second cone 101 therebetween, and having a second threaded portion 111 (i.e., an externally threaded portion) thereon for being screwed to the internal threads provided in the hollow end of the shaft 63 of the handle 61 of the pump means 22 as clearly shown in FIG. 13. A slot 112 may be provided through the base 107 adjacent the first threaded portion 109 for allowing the fishing line 13 to extend therethrough. The end of the reel member 95 opposite the first cone 99 preferably includes anti-rotation means 113 such as a square peg or boss member, etc., for coacting with a coacting anti-rotation means 114 such as a square aperture or cavity, etc., in the pump means 22 (e.g., in the underside of the piston 59) to prevent the reel member 95 from rotating when the reel member 95 is located in the hollow cavity of the shaft 63 of the handle 61 of the pump means 22 as clearly shown in FIG. 13. When it is desired to wind additional line from or onto the reel member 95, the reel member 95 will need to be removed at least partially from the hollow cavity of the shaft 63 of the handle 61 of the pump means 22.

The fishing float apparatus 11 may include a snap-shut door 115 or the like for selectively closing the opened end of the handle 61 of the pump means 22. The door 115 has a central aperture 116 therethrough for allowing the fishing line 13 to extend therethrough.

As thus constructed, the present invention provides a fishing float apparatus 11 that can be safely stored in a small space with the protective cover 21 protecting the balloon 19 from damage, etc., and that can be quickly "inflated" by merely removing the cap member 49 from the sleeve 43, twisting and sliding the sleeve 43 to the retracted position, twisting and releasing the pump means 22, and then reciprocating the piston head 59 of the piston 57 of the pump means 22 back and forth in the chamber 29 to inflate the balloon 19. The preferred method of using the fishing float apparatus 11 is to store one or a number of such fishing float apparatuses 11 in a tackle box or the like in the compact position and then merely remove the cap member 49 from the sleeve 43, move the sleeve 43 to the retracted position, and then inflate the balloon 19. A desired amount of fishing line 13 can then be extended through the aperture 116 in the door 115, and a fishing hook 117 tied thereto and appropriately baited. The inflated fishing float apparatus 11 can then be placed in the body 15 of water as will now be apparent to those skilled in the art. When it is desired to stop fishing, the balloon 19 can be deflated by merely pushing down on the button-like end 81 of the valve member 75. After the balloon 19 has thus been deflated, the sleeve 43 can be moved to the extended position and the cap member 49 placed back on the sleeve 43 to thereby fully protect the balloon 19 when the fishing float apparatus 11 is stored. The fishing line 13, fishing hook 117, sinkers, etc., can be stored within the handle 61 behind the door 115 as will now be apparent to those skilled in the art.

Although the present invention has been described and illustrated with respect to a preferred embodiment and a preferred use therefor, it is not to be so limited since modifications and changes can be made therein which are within the full intended scope of the invention.

I claim:

1. A fishing float apparatus for floatably supporting a fishing line in a body of water, said fishing float apparatus comprising:
   (a) a body member having a first end, a second end, a chamber extending between said first and second ends, and an air exhaust port therein for allowing air to pass from said chamber thereof;
   (b) a balloon attached to said second end of said body member, said balloon having a deflated position and an inflated position;
   (c) a protective cover for covering said balloon when said balloon is in said deflated position;
   (d) pump means for inflating said balloon; said pump means including a piston reciprocally mounted in said chamber of said body member for pumping air into said balloon to inflate said balloon when said piston is reciprocated within said chamber;
   (e) attachment means for attaching one end of the fishing line to said body member; and
   (f) an air release valve means for allowing air to pass from said balloon to deflate said balloon; said air release valve means including a valve member movable between a closed position in which said air exhaust port of said body member is blocked to prevent air from passing therethrough and an open position in which said air exhaust port of said body member is opened to allow air to pass therethrough; said valve means including spring means for normally urging said valve member to said closed position, and a rubber seal for being urged against said air exhaust port of said body member when said valve member is in said closed position.

2. A fishing float apparatus for floatably supporting a fishing line in a body of water, said fishing float apparatus comprising:
   (a) a body member having a first end, a second end, and a chamber extending between said first and second ends;
   (b) a balloon attached to said second end of said body member, said balloon having a deflated position and an inflated position;
   (c) a protective cover for covering said balloon when said balloon is in said deflated position; said protective cover is slidably attached to said body member for movement between an extended position in which said balloon is covered and a retracted position in which said balloon is uncovered;
   (d) pump means for inflating said balloon;
   (e) attachment means for attaching one end of the fishing line to said body member; and
   (f) guide means for guiding the movement of said protective cover between said extended and retracted positions; said guide means including a guide track on said body member and a guide pin on said protective cover for sliding within said guide track; said guide track being configured to securely hold said protective cover in said extended position and said retracted position.

3. A fishing float apparatus for floatably supporting a fishing line in a body of water, said fishing float apparatus comprising:
   (a) a body member having a first end, a second end, and a chamber extending between said first and second ends;
   (b) a balloon attached to said second end of said body member, said balloon having a deflated position and an inflated position;
   (c) a protective cover for covering said balloon when said balloon is in said deflated position; said protective cover having an open first end attached to said second end of said body member and has an open second end;
   (d) pump means for inflating said balloon; and
   (e) attachment means for attaching one end of the fishing line to said body member; and
   (f) a cap member for closing said open second end of said protective cover when said balloon is in said deflated position.

4. A fishing float apparatus for floatably supporting a fishing line in a body of water, said fishing float apparatus comprising:
   (a) a body member having a first end, a second end, and a chamber extending between said first and second ends;
   (b) a balloon attached to said second end of said body member, said balloon having a deflated position and an inflated position;
   (c) a protective cover for covering said balloon when said balloon is in said deflated position;
   (d) pump means for inflating said balloon; said pump means including a piston reciprocally mounted in said chamber of said body member for pumping air into said balloon to inflate said balloon when said piston is reciprocated within said chamber; said pump means including a handle for allowing manual reciprocation of said piston in said chamber of said body member; said pump means including a shaft having a first end attached to said handle and having a second end attached to said piston;
   (e) attachment means for attaching one end of the fishing line to said body member; and
   (f) lock means for locking said pump means to said body member in a compact, closed position.

5. A fishing float apparatus for floatably supporting a fishing line in a body of water, said fishing float apparatus comprising:
   (a) a body member having a first end, a second end, and a chamber extending between said first and second ends;
   (b) a balloon attached to said second end of said body member, said balloon having a deflated position and an inflated position;
   (c) a protective cover for covering said balloon when said balloon is in said deflated position;
   (d) pump means for inflating said balloon; said pump means including a piston reciprocally mounted in said chamber of said body member for pumping air into said balloon to inflate said balloon when said piston is reciprocated within said chamber; said pump means including a handle for allowing manual reciprocation of said piston in said chamber of said body member; and (e) attachment means for attaching one end of the fishing line to said body member; said attachment means including an eyelet attached to said handle of said pump means for allowing the fishing line to be tied thereto.

6. A fishing float apparatus for floatably supporting a fishing line in a body of water, said fishing float apparatus comprising:

(a) a body member having a first end, a second end, and a chamber extending between said first and second ends;

(b) a balloon attached to said second end of said body member, said balloon having a deflated position and an inflated position;

(c) a protective cover for covering said balloon when said balloon is in said deflated position;

(d) pump means for inflating said balloon; said pump means including a piston reciprocally mounted in said chamber of said body member for pumping air into said balloon to inflate said balloon when said piston is reciprocated within said chamber; said pump means including a handle for allowing manual reciprocation of said piston in said chamber of said body member; and (e) attachment means for attaching one end of the fishing line to said body member said attachment means including a reel member for allowing a length of the fishing line to be wound thereabout.

7. The fishing float apparatus of claim 6 in which said attachment means includes a friction line lock means for allowing variable lengths of the fishing line to be unwound from said reel member.

8. The fishing float apparatus of claim 7 in which said friction line lock means includes a first cone attached to said reel member, a second cone positioned over said first cone, and urging means for urging said second cone against said first cone so that the fishing line can be frictionally secured to said friction line lock means by placing a length of the fishing line between said first and second cones and then urging said second cone against said first cone.

* * * * *